United States Patent
Avvari et al.

(10) Patent No.: US 11,267,127 B1
(45) Date of Patent: Mar. 8, 2022

(54) SYSTEM AND METHOD FOR DETERMINING A DISCRETE NUMBER OF SELECTED WORKPIECES

(71) Applicant: CreateMe Technologies LLC, New York, NY (US)

(72) Inventors: Gopi V. Avvari, Dublin, CA (US); Hossein Mousavi Hondori, Mountain View, CA (US); Weixin Yang, San Francisco, CA (US)

(73) Assignee: CREATEME TECHNOLOGIES LLC, New York, NY (US)

( * ) Notice: Subject to any disclaimer, the term of this patent is extended or adjusted under 35 U.S.C. 154(b) by 0 days.

(21) Appl. No.: 17/364,605

(22) Filed: Jun. 30, 2021

(51) Int. Cl.
| | |
|---|---|
| G05B 15/00 | (2006.01) |
| G05B 19/00 | (2006.01) |
| B25J 9/16 | (2006.01) |
| G01G 19/414 | (2006.01) |
| G01M 1/12 | (2006.01) |

(52) U.S. Cl.
CPC .......... *B25J 9/1694* (2013.01); *G01G 19/414* (2013.01); *G01M 1/122* (2013.01)

(58) Field of Classification Search
CPC ...... B25J 9/1694; G01G 19/414; G01M 1/122
See application file for complete search history.

(56) References Cited

U.S. PATENT DOCUMENTS

| | | | | |
|---|---|---|---|---|
| 1,134,112 | A * | 4/1915 | Drexelius | G01G 19/42 177/26 |
| 5,072,797 | A * | 12/1991 | Hughes | G01G 15/00 177/145 |
| 2015/0321825 | A1* | 11/2015 | Schwanitz | G01G 15/00 221/152 |
| 2016/0019688 | A1* | 1/2016 | Li | G06T 17/00 348/46 |
| 2020/0041329 | A1* | 2/2020 | Shike | E02F 9/26 |
| 2020/0269429 | A1* | 8/2020 | Chavez | B25J 15/0616 |

OTHER PUBLICATIONS

Anonymous, "Non-fungible token," Wikipedia, 14 pages, Jun. 18, 2021, retrieved from https://en.wikipedia.org/wiki/Non-fungible_token.

* cited by examiner

*Primary Examiner* — Harry Y Oh
(74) *Attorney, Agent, or Firm* — Zilka-Kotab, P.C.

(57) ABSTRACT

A system for determining a discrete number of flexible, non-rigid workpiece items loaded onto a robotic carrier. The system includes a robotic carrier capable of traveling to multiple workstations, at least one of which is a weigh station. A loading mechanism is functional to load one or more workpieces onto the robotic carrier which weighed by the weigh station. By comparing the weight of the loaded items with a predetermined weight range of a single workpiece, the number of discrete workpieces loaded onto the robotic carrier can be determined. In addition, a method can be provided for determine position error of a mobile robot based on a detected center of gravity of the mobile robot.

7 Claims, 8 Drawing Sheets

SYSTEM AND METHOD FOR DETERMINING A DISCRETE NUMBER OF SELECTED WORKPIECES

FIELD OF THE INVENTION

The embodiments presented relate to automated processing of non-rigid workpieces and more particularly to a system for determining the number of garment workpieces selected for processing.

BACKGROUND

The manufacture of garments and textile products has existed for thousands of years. Within recent history many advances have been made with regard to the fabrication of textile products such as with regard to the automated fabrication of textiles. In addition, new types of textile materials such as synthetic materials, synthetic/natural blends and new automated weaving technologies have been developed. The apparel manufacturing, retailing and fitting industries include a diverse range of parties, such as designers, fabric manufacturers, apparel cutting and sewing workers, retailers, tailors, etc. The apparel manufacturing industry relies upon various resources, processes, and equipment to produce finished garments, accessories, footwear, etc. Generally, a process to manufacture a garment includes garment design, fabric production and/or printing, and panel cutting and sewing. Many aspects of apparel manufacturing processes are relatively time consuming and require the coordination of many different geographically dislocated suppliers, vendors, manufacturers and retailers.

In spite of advances in manufacturing technology in the textile and garment industry, the vast majority of the work of fabricating garments has involved large amounts of tedious human labor. Although garments are cut and sewn with the assistance of machines, the process is nevertheless labor-intensive and includes the manual movement of patterns, sewn garments, and operation of sewing machines and other kinds of equipment. For this reason, much of the fabrication of garments has been limited to regions with access to inexpensive labor.

Part of the reason for this lack of automation and labor intensiveness results from the unique attributes of textiles and garments in general. Garments and textile products in general have unique properties that make them difficult to fabric in an automated fashion. For example, fabrics by nature have a soft, flexible, amorphous, and often stretchy nature that makes them difficult to manipulate in a predictable, reliable manner in an automated system.

Therefore, there remains a need for improved automation in the garment industry which can allow garments and other textile products to be efficiently, reliably manufactured without the need for labor intensive human interaction.

SUMMARY

The disclosed embodiments provide a system for fabricating non-rigid items. The system includes a robotic carrier configured to carry workpiece items between multiple workstations, at least one of the workstations comprising a weigh station. A loading mechanism is provided for loading one or more workpiece items onto the robotic carrier. The weigh station includes a scale configured to weigh the robotic carrier and one or more workpiece items loaded onto the robotic carrier, the scale having a scale base and a plurality of weight sensors connected with the scale base. The weigh station also includes memory for storing an expected weight range of an individual workpiece. In addition, the weigh station includes circuitry that is configured to receive a signal from the plurality of weight sensors and to determine a weight of the one or more workpieces loaded onto the robotic carrier based on the weight of the one or more workpieces and the expected weight range of the individual workpiece.

The circuitry can be functional to transmit data regarding the discrete number of workpieces to a central control unit, the central control unit being functional to control movement of the robotic carrier and to control manufacturing operations at the multiple workstations.

In one embodiment, the weight sensors can be load cells. Alternatively, the weight sensors can be piezoelectric sensors. The circuitry can be functional to transmit the discrete number of workpieces to a user interface.

In one embodiment the expected weight range of an individual workpiece can be based on a standard deviation of a sample set of similar workpieces. With the manufacture of workpiece items such as apparels the deviation between various garments can be large. This can be, for example, as a result of the large number of various materials that can be used to manufacture or assemble a workpiece item such as a garment.

In one embodiment, the robotic carrier can include a camera and can move from one station to another by using the camera to follow a visible line and by detecting a series of visible checkpoints such as QR codes.

The present embodiment can provide a method determining a discrete number of non-rigid workpiece items. The method includes loading one or more workpiece items onto a robotic carrier and moving the carrier onto a weigh station. The weight of the one or more workpieces can then be determined and this weight can be compared with a weight range of a single workpiece item to determine the number of workpiece items loaded onto the robotic carrier.

The items can be loaded onto the robotic carrier before the robotic carrier has been moved onto the weigh station, or, alternatively, the items can be moved onto the robotic carrier after the robotic carrier has been moved onto the workstation. The robotic carrier and the one or more workpiece items can be weighed together and the weight of the robotic carrier subtracted from the total weight. Alternatively, the robotic carrier can be moved onto the weigh station, the weight set to zero and then the workpieces loaded onto the robotic carrier.

The information regarding the number of loaded workpieces can be sent to a central control unit. In one embodiment, the information regarding the number of loaded workpieces can be transmitted wirelessly to the central control unit. The central control unit can be functional to control manufacturing operations at multiple workstations and can be functional to control movement of the robotic carrier across the multiple workstations.

Some embodiments can also provide a method for correcting for error in movement of a robotic carrier. The method can include moving a robotic carrier onto a weigh station, the weigh station being functional to detect a center of gravity of the robotic carrier on the weigh station. The center of gravity of the robotic carrier can be compared with a predetermined intended center of gravity to determine a variation in the location of the robotic carrier, and then instructions can be provided to correct the travel of the robotic carrier if the center of gravity is different from the predetermined center of gravity.

The instruction to correct the path of travel of the robotic carrier can include one or more of speed of the robotic carrier and direction of travel of the robotic carrier. The weigh station can include a scale having at least three evenly spaced weight sensors and may include a scale having four weight sensors located at opposite corners of the scale.

These and other features and advantages will be apparent to one of skill in the art upon reading of the following detailed description of the embodiments in conjunction with the figures. In the figures, like reference numerals used in more than one figure indicate a like element and may be considered in light of the description of the like element presented in any of the other figures having the like element.

BRIEF DESCRIPTION OF THE DRAWINGS

For a fuller understanding of the nature and advantages of the embodiments, as well as the preferred mode of use, reference should be made to the following detailed description read in conjunction with the accompanying drawings. The drawings are not presented to scale unless specified otherwise on an individual basis.

DETAILED DESCRIPTION

The following description includes the best embodiments presently contemplated for carrying out the embodiments. This description is made for the purpose of illustrating the general principles and is not meant to limit the inventive concepts claimed herein in any way.

Figure 1:
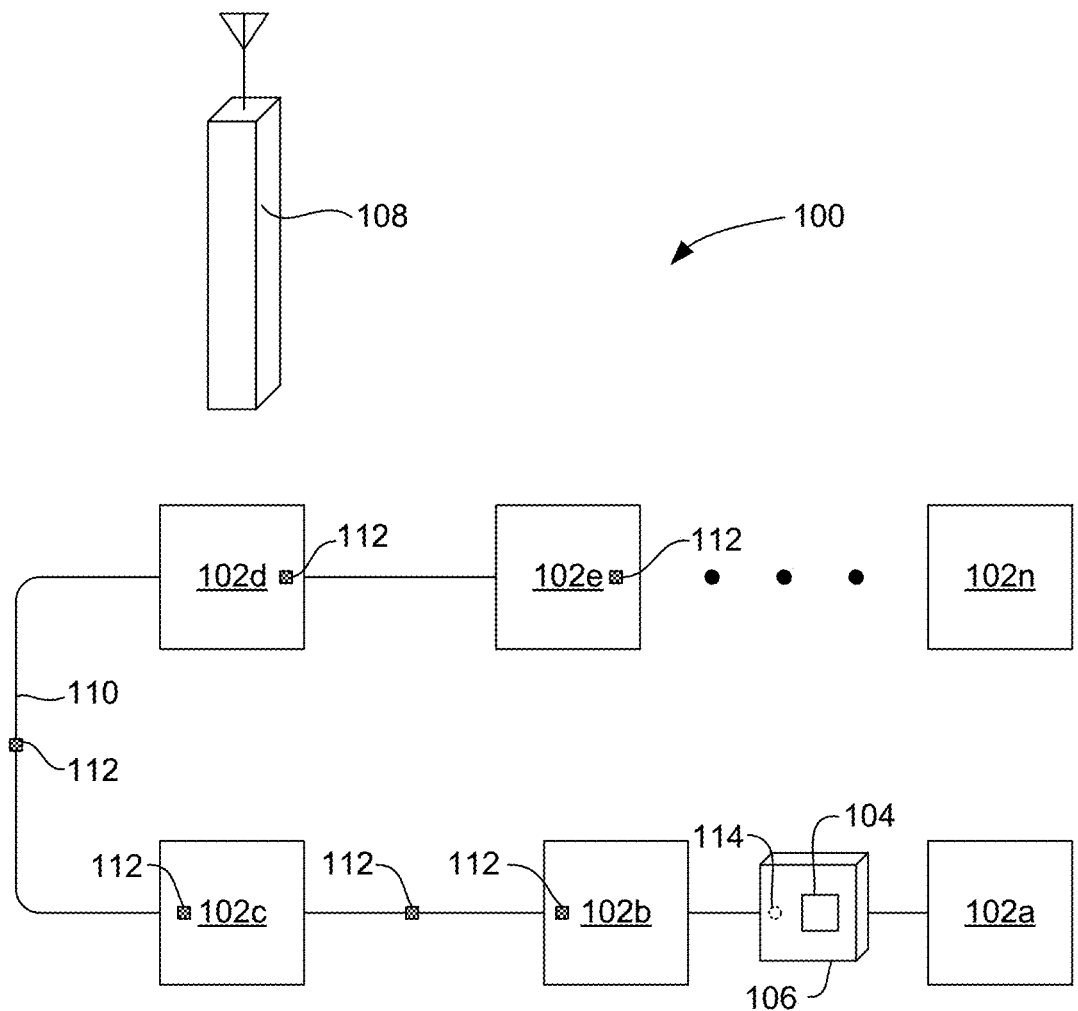
FIG. 1 is a schematic overview of an automated manufacturing system employing a plurality of workstations and robotic carrier configured to move one or more workpieces to selected workstations.

Referring to FIG. 1, is a schematic plan view of an automated system 100 for manufacturing or processing items. The system 100 can be specifically configured to process or manufacture items having an amorphous or non-rigid nature such as garments or textile products. The system 100 includes a plurality of workstations 102a-n in which various manufacturing processes can be performed on one or more workpieces. Workpieces 104 can be carried from one workstation to another 102 by a robotic carrier 106, which will be described in greater detail herein below.

The robotic carrier can optionally be controlled by a central control station 108 that can wirelessly direct the path of the robotic carrier 104 using various control circuitry within or without the control station 108. The central control station can also directly or indirectly control or affect manufacturing operations at the various workstations 102.

The robotic carrier 106 moves from one station to the next carrying one or more workpieces either on top of the robotic carrier 106 or in some other manner. In one embodiment, the robotic carrier can be configured to track a visible line 110 painted or otherwise formed on a workshop floor to thereby follow a desired predetermined path along the workshop floor. Progress along the line 110 can be monitored by checkpoint locations 112. These checkpoint locations can be, for example, QR codes which can be read by the robotic carrier 106. The robotic carrier can have a camera 114 mounted one or within it near its bottom surface. The camera 114 can allow the robotic carrier 106 to both follow the visible line 110 and read the various checkpoints 112 (such as QR codes) to facilitate its movement long the desired path and to stop at various workstations 102 as desired. The camera 114 may be connected with, coupled to or in communication with various circuitry (not shown) configured to facilitate following the visual line 110 and to read the various QR codes 112 and also, optionally, to communicate this information wirelessly with the central controller 108.

Figure 2:
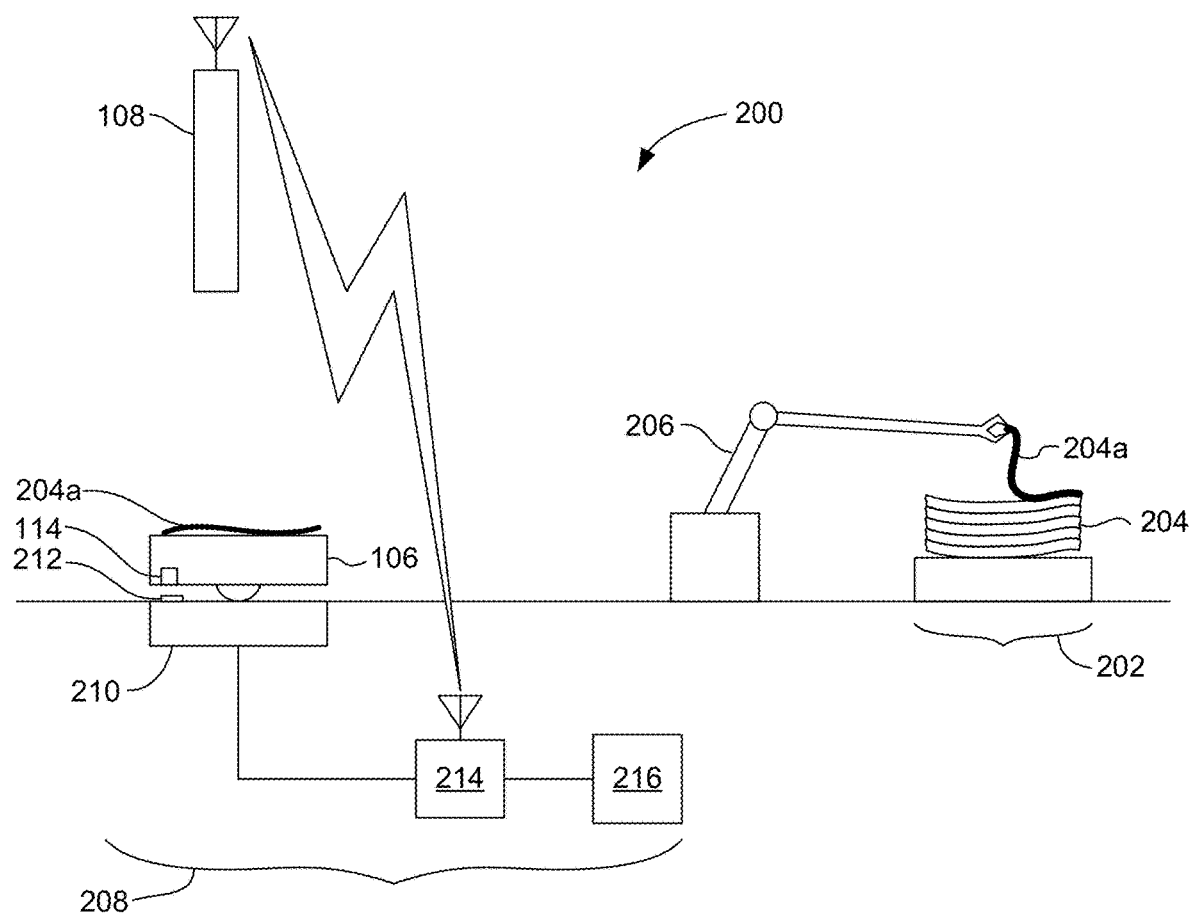
FIG. 2 is a schematic side-view of a weigh station configured to determine a quantity of workpiece items loaded onto a robotic carrier.

FIG. 2 shows a side view of a portion of an automated system such as the system 100 of FIG. 1, illustrating a system 200 for determining a quantity of soft, flexible non-rigid workpiece items can be determined during a manufacturing process. As shown in FIG. 2, a first workpiece loading station 202 is configured to store a plurality (e.g. stack) of workpiece items 204.

A loading mechanism 206 is configured to select a desired number of workpiece items 204a from the workpiece loading station 202 and load them onto the robotic carrier 106. The loading mechanism 206 can be, for example, an automated arm capable of grasping a single workpiece item, or another desired quantity of workpiece items 204a. However, this is by way of example as the loading mechanism could be some other type of device.

With most automated manufacturing systems wherein items manufactured include solid, rigid workpieces, the selection of a single workpiece or a select number of workpieces is a relatively straightforward process and can be accurately carried out at the point of selection of the workpiece (i.e. at the loading station 202). However, the manufacture of flexible, amorphous items such as garments or textile products presents unique challenges. While the loading mechanism can be configured as best as possible to select only a single workpiece item or a predetermined number of workpiece items 204a, there is a chance that the loading mechanism can inadvertently pick up unwanted additional workpiece items 204 or less than the desired number of items 204. In addition, items such as garments can have a large variance in weight for a single garment item. Whereas items such as bolts, nuts or mechanical parts can have nearly identical and predictable weights from one single item to another, garments can be constructed of various pieces such as fabric pieces, accessories, zippers, buttons each of which can have a weight variation. This makes the determination of a discrete number of garment items based on weight more challenging. This can be overcome by determining an acceptable weight range for a single item. In some embodiments this weight range for garment items can be wider than would be necessary with other types of items.

In order to accurately ensure that the correct number of workpiece items 204a have been loaded onto the robotic carrier 106, the system 200 incorporates a highly accurate weigh station 208. This weigh station 208 can be included as one of the workstations 102 described above with reference to FIG. 1. The weigh station 208 can include a scale 210, which will be described in greater detail herein below. Like other of the workstations 102, the scale 210 can have a marker such as a QR code 212 located at a desired location on its surface. The marker or QR code 212 can be read by the camera 114 in the robotic carrier 106 to indicate a location at which the robotic carrier 106 should stop on the scale 210.

The weigh station 208 can also include circuitry 214 that can be connected with the scale. The circuitry 214 can be functional to determine the weight of the workpiece item or items 204a located on the robotic carrier 206. This information about the weight of the item or items on the robotic carrier 106 can be used to calculate the number of such items located on the robotic carrier 106. Optionally, the circuitry 214 can be configured to transmit this information to the control center 108, either wired or wirelessly. In addition, information about the weight and quantity of items 204a on the carrier 106 can be sent to a user interface 216, such as a computer monitor, a printer or a personal electronic device such as a cell phone, a personal computer, a laptop, a notebook, etc.

Figure 3A:
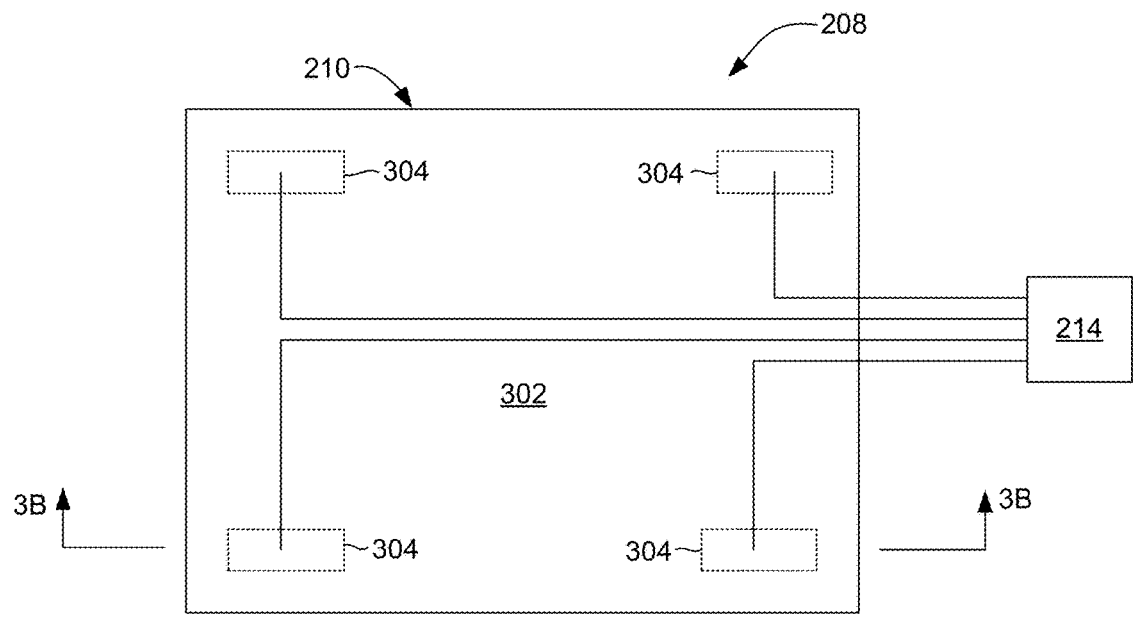
FIG. 3A is a top-down view of an embodiment of the weigh station of FIG. 2.
Figure 3B:
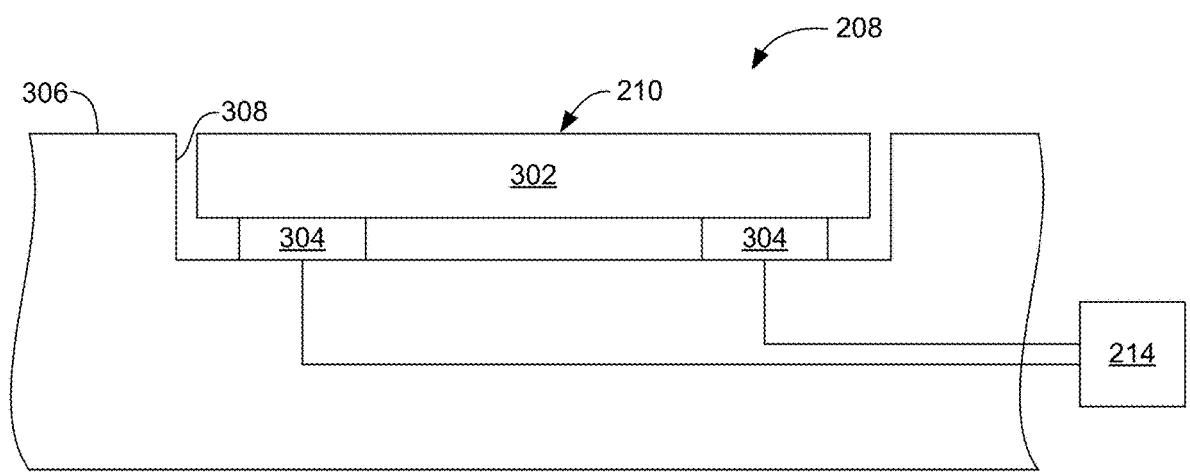
FIG. 3B is a side view of the weigh station of FIGS. 2 and 3A.

FIG. 3A is a top-down enlarged schematic view of a weigh station 208 according to an embodiment, and FIG. 3B is a side, cross-sectional view of the weigh station 208 as seen from line 3B-3B of FIG. 3A. As mentioned above, the weigh station 208 can include a scale 210. The scale 210 can include a scale base 302 and a plurality of weight sensors 304. The scale base 302 can have a square or rectangular base, however, other shapes are possible as well, such as round or triangular. The weight sensors 304 are preferably located near outer corners of the scale base 302, and if the scale base 302 has a rectangular or square shape, the scale 210 preferably has four such weight sensors 304 located at or near the four outer corners of the scale base 302. The scale 210 preferably includes at least three weight sensors 304.

The scale 210 can be formed on the workshop floor, and is preferably located within a recess 308 formed in the workshop floor 306 such that the upper surface of the scale base 210 can be generally flush with the surface of the workshop floor 306. This can more easily facilitate the travel of the robotic carrier 106 (FIGS. 1 and 2) onto the scale 210. Signals from each of the weight sensors 304 can be sent to circuitry 214 such as previously described above with reference to FIG. 2. The circuitry 214 can be functional to determine the weight of the workpiece item loaded on the robotic carrier 106 and functional to calculate the location of the robotic carrier 106 on the scale 210 (as will be discussed in greater detail herein below). In other embodiments the scale 210 can be suspended, such as from a ceiling or other structure, rather than being formed into a recess in a workshop floor as discussed above.

In order to determine the weight of the individual work piece item or items 204a, the weight of the unloaded robotic carrier 106 can first be determined (e.g. weighed). This can then be compared with the weight of the loaded robotic carrier 106 to determine the weight of the loaded workpiece items 204a. Alternatively, the circuitry 214 can be configured to zero out the weight measurement after the robotic carrier has moved onto the scale 210 and before loading the workpiece item 204a has been loaded onto the scale 210. Then, when the workpiece item 204a has been loaded, the weight of only the workpiece will be measured. In yet another embodiment, the weight of robotic carrier 106 can be previously known and recorded, and this weight can be subtracted from the total weight by the circuitry 214 to arrive at the weight of the workpiece (or workpieces) 204a alone.

In addition to determining the weight of the loaded workpiece or workpieces 204a, the circuitry 214 is also functional to use this weight calculation to determine the exact number of workpiece items 204a loaded on the robotic carrier 106. Of course, this would also include a determination that no workplace items have been placed on the robotic carrier, in the situation where the loader 206 (FIG. 2) failed to successfully load the desired number of workpieces onto the robotic carrier 106. In order to determine the exact number of loaded workpiece items 204a, the anticipated weight of a workpiece item can be stored in memory within or separately from the circuitry 214. This weight value can preferably be changed based on the workpiece item being loaded, as the system can be adaptable to accommodate different workpiece items. This weight value is preferably a weight value range and can be determined based on a standard deviation of a sample set of similar workpiece items. Alternatively, the stored workpiece weight range can be determined by some other statistical methodology.

As previously discussed, a garment workpiece could be made of different materials. In some embodiments, two different workpieces would not be alike and would have significantly different weight, since they can be made of different materials. Because of this, the standard deviation of the weight of a garment workpiece would be large compared with other types of items such as nuts, bolts and other mechanical pieces which would have a much more consistent weight between items.

Figure 8:
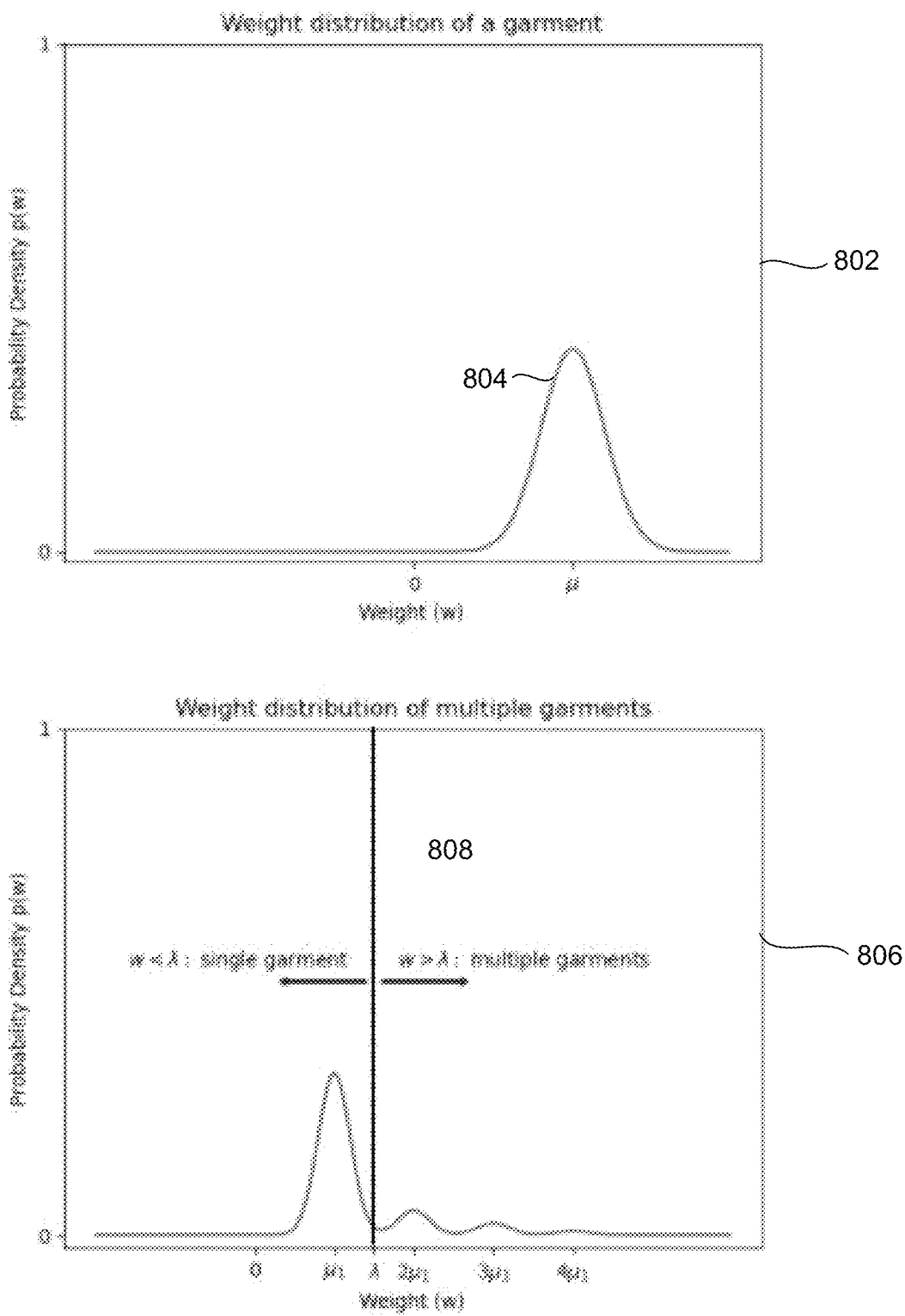
FIG. 8 shows graphs illustrating weight distributions of single and multiple garments.

The determination of the number of garments can be performed with an assumption that each garment has a normal weight distribution, resulting in a gaussian mixture problem when multiple garments are picked up. By calculating the threshold to this gaussian mixture problem, the number of loaded garments can be determined. This can be more clearly understood with reference to FIG. 8. In FIG. 8, graph 802 shows the weight distribution 804 of a single garment. As can be seen, the weight distribution for garments is relatively wide. If one were to measure the weight distribution of other mechanical items such as bolts, the weight distribution would be more like a stepwise spike, since all measured items would have the same predictable weight. Graph 806 shows the weight distribution for a single garment and multiple garments. The large spike at location $\mu_1$ shows the probability density for a single garment, whereas locations $2\mu_1$, $3\mu_1$, $4\mu_1$, show the probability density for 2, 3 and 4 garments. Line 808 indicates a threshold weight that can be used to determine whether one garment has been loaded or multiple garments have been loaded.

Once the number of workpiece items 204a has been determined, this information can be delivered to the central controller 108 as discussed above with reference to FIG. 2. The central controller can then determine whether the loader 206 needs to be engaged to either remove or add another workpiece item 204. In addition, as discussed above, the circuitry 216 can also deliver a signal to a user interface, such as a printer, monitor, computer or personal electronic device such as a cell phone or laptop.

Figure 4A:
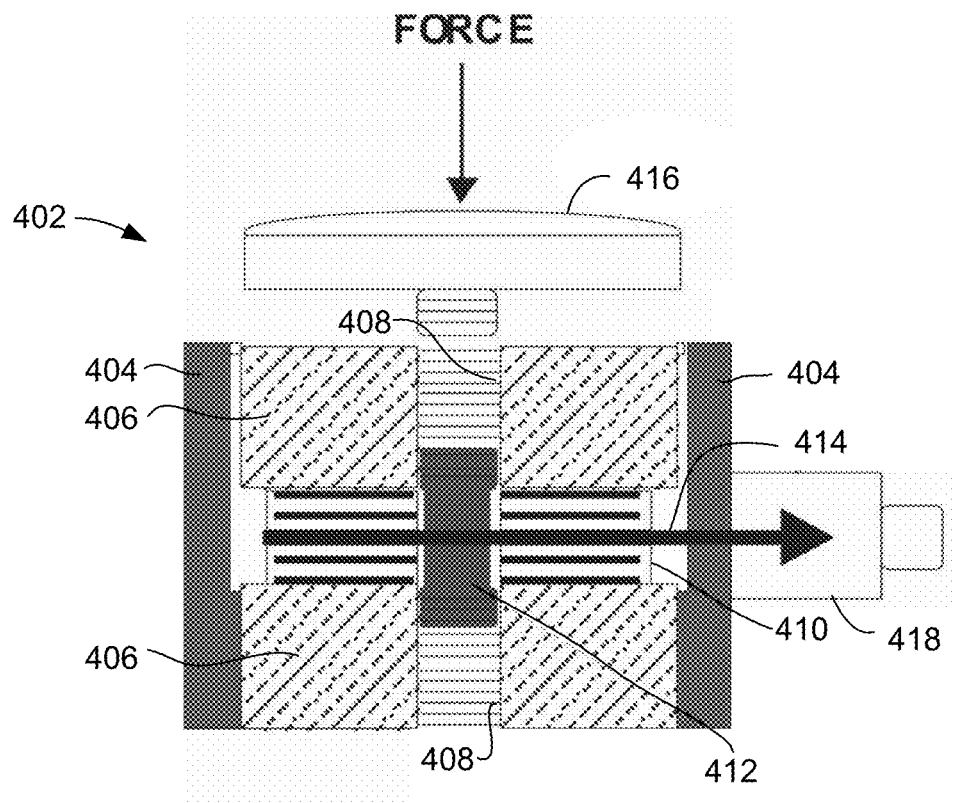
FIG. 4A is a cross-sectional view of a weight sensing element according to an embodiment.

FIG. 4A is a cross-sectional view of an example of a piezoelectric sensor 402 that can be used as one possible embodiment of a weight sensor element 304, such as described above with reference to FIGS. 3A and 3B. The piezoelectric sensor 402 includes a housing 404 and a pair of pressure plates 406 each having a threaded mounting hole 408 formed therein. A Piezoelectric element 410 formed of a piezoelectric material such as quartz is sandwiched between the pressure plates 406. A piezoelectric material is a material that generates an electrical current when placed under a mechanical strain. A preload stud 412 can be mounted within the mounting holes 408 in the pressure plates 406 to hold the pressure plates together against the piezoelectric element 410 and to apply a predetermined pressure on the piezoelectric element 410. A charge collection plate 414 can be located within the piezoelectric element 410 to apply collect an electrical charge when the piezoelectric element 402 is under a load. In addition, an impact cap 416 can be provided, and threaded into the opening 408 in one of the pressure plates.

When a load is applied to the impact cap 416, this causes the pressure plates 406 to press together placing a mechanical strain on the piezoelectric element 410. This causes an electrical potential within the piezoelectric element 410 which is collected by the collection plate 414. The collection plate 414 can deliver this electrical potential to an amplifier 418. Because the electrical potential developed within the piezoelectric element is proportional to the amount of load applied by the impact cap, the voltage potential provided by the amplifier can accurately reflect the amount of load experienced by the piezoelectric element 402.

Figure 4B:
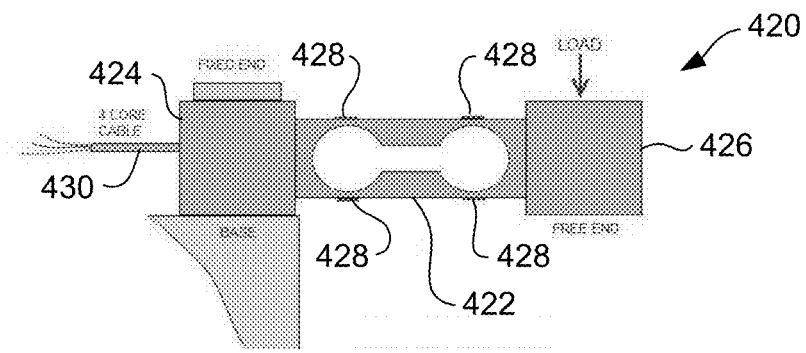
FIG. 4B is a view of a weight sensing element according to an alternate embodiment.

FIG. 4B illustrates an alternate embodiment wherein a load cell 420 can be used as the weight sensor element 304 of FIG. 3. The load cell 420 includes a bar 422 having a fixed end 424 and a free end 426. The bar can also have an opening extending therethrough that can have a dumbbell shaped cross-section as shown. Four strain gages 428 are attached to strategic locations on the bar 422 as shown, and these strain gages can be electrically connected with an output cable 430 for delivering an output to the other circuitry as explained further herein below.

In use, the fixed end 424 can be connected with a fixed surface such as the workshop floor 306 described above with reference to FIG. 3. The free end can be attached to the scale base 302, also described above with reference to FIG. 3b. When a load is applied to the free end 426, a resulting strain in the bar is 422 is detected by the four strain gages which each experience a unique electrical resistance change resulting as a result of this strain. The four strain gages 428 can form a Wheatstone bridge which can be used to by external circuitry determine the amount of force loaded to the load cell 420. It should be pointed out, that the piezoelectric sensor 402 described above with reference to FIG. 4a and the load cell 420 described above with reference to FIG. 4b are exemplary embodiments of weight sensors that could be used for the weight sensor element 304 of FIGS. 3a and 3b, as other types of sensors capable of sensing a change in weight pressure or force could be used as well.

Figure 5:
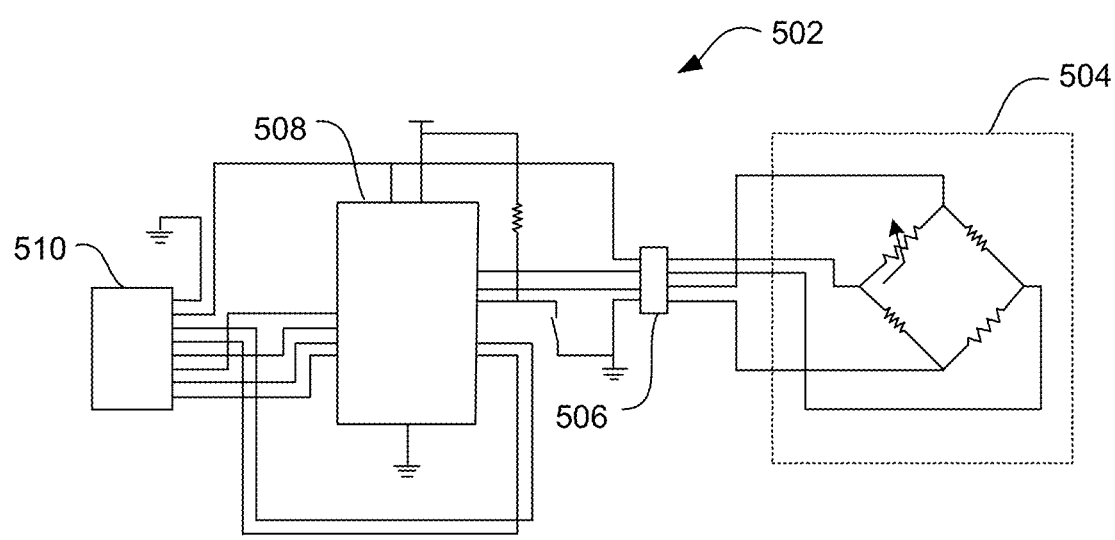
FIG. 5 is a schematic illustration of circuitry for determining the weight of one or more items loaded on a robotic carrier.

FIG. 5 is a schematic view of circuitry 502 that can be used to determine a weight of items applied to the scale 210 of FIGS. 2, 3a, and 3b. The circuitry 502 can include an electrical signal from one or more weight sensors 504. If the weight sensor is a load cell, such as the load cell 420 described above with reference to FIG. 4B, the sensor 504 can be schematically described as a Wheatstone Bridge as shown in FIG. 5. In this case, the output from the weight sensor 504 would have four output lines as shown.

The output from the weight sensor 504 can be fed to an amplifier circuit 506. The amplifier 506 provides an amplified signal to a microcontroller unit 508, which can interpret the amplified signal to provide determine an actual weight and calculate an incremental number of workpiece items 204a loaded on the robotic carrier 106 (FIG. 2) based on the weight measurement from the weight sensor or sensors 504. This determined number of items can be sent to a display, printer or personal computing device 510, and can also be transmitted to a central control unit such as central controller 108 (FIG. 2).

Figure 6:
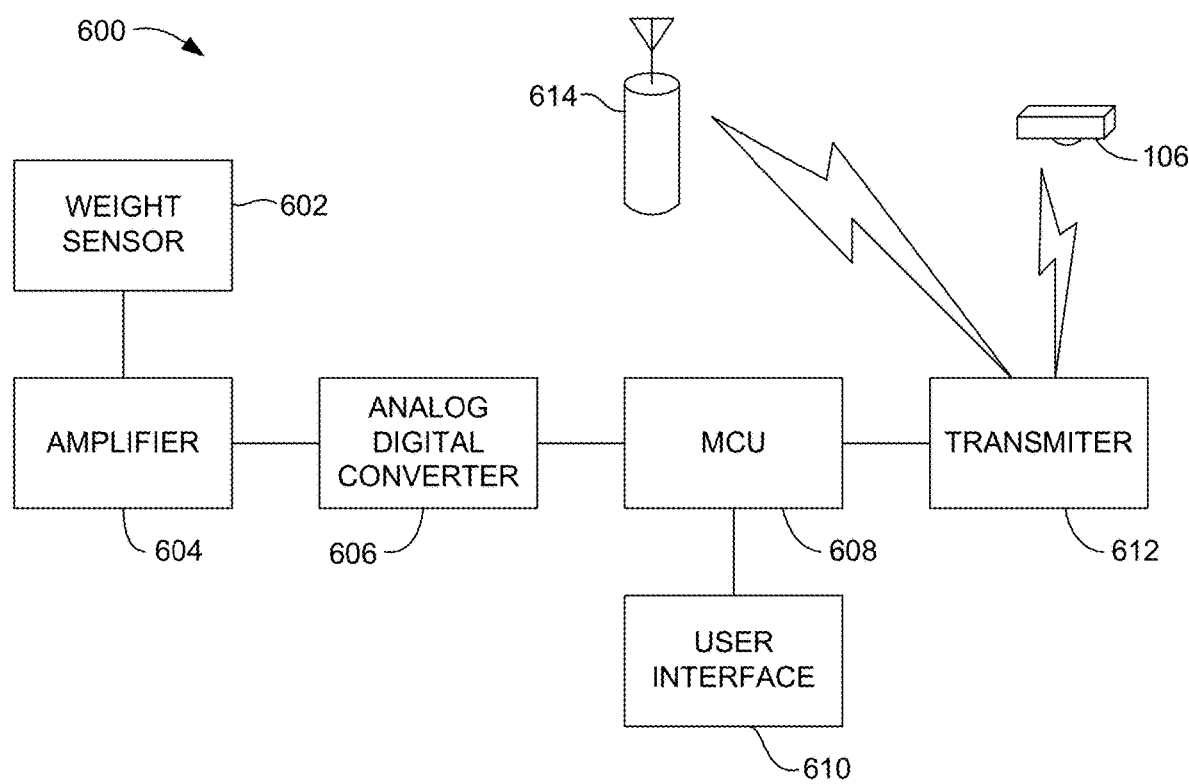
FIG. 6 is a schematic illustration of circuitry functional to determine a weight of loaded items and transmit information to one or more of a central control unit and a robotic carrier.

FIG. 6 illustrates a schematic flowchart for a system 600 for determining a discrete number of workpiece items selected. The system 600 includes at least one weight sensor 602, as previously described. The weight sensor 602 can be a load cell or piezoelectric sensor as previously described. The weight sensor 602 provides a signal indicative of a weight of an item and sends this signal to an amplifier 604. The amplifier amplifies the signal providing an amplified analog signal to an analog to digital converter (ADC) 606. The ADC 606 converts the analog signal to a digital signal and sends this digital signal to a microcontroller unit (MCU) 608.

The microcontroller unit 608 can be programmed to calculate a discreet number of weighed items. This calculation can include an expected weight range of an individual item. The expected weight range of such a weighed item can be stored in computer storage and retrieved for calculation of a discrete number of weighed items. Once the discrete number of weighed items has been calculated, this value can be delivered to a user interface 610. This value can also be delivered to a transmitter 612, where it can be delivered wirelessly to a central control unit 614 and/or to a robotic carrier 616. In lieu of the transmitter, the discrete item calculation can be delivered directly to the central controller 614 in a wired manner.

In addition to determining a discrete number of selected or loaded items as described above, the discussed weighing system can be used to determine an amount of deviation or variation from an intended path of the robotic carrier 106 due to a variety of reasons, including malfunction of one or more robot components, imbalance between robot components, uneven workspace floor, etc. The ability to determine and ultimately correct deviations in the performance of a robot introduces fault tolerance in the design of the robots which in turn enables a much simpler and less costly robots design. As discussed above, for example with reference to FIG. 1, the path of the robotic carrier 106 can be controlled by following a visual line 110 formed on a workshop floor and by the use of checkpoints 112 that can be in the form or QR codes displayed on the workshop form. Movement of the robotic carrier can be assisted and controlled by a central control unit 108. However, there may be times when these systems do not perfectly control the motion of the robotic carrier along the desired path. Alternatively, the malfunction of one or more robot components, imbalance between robot components, uneven workspace floor may result in similar deviations from the desired path by a robot.

Figure 7:
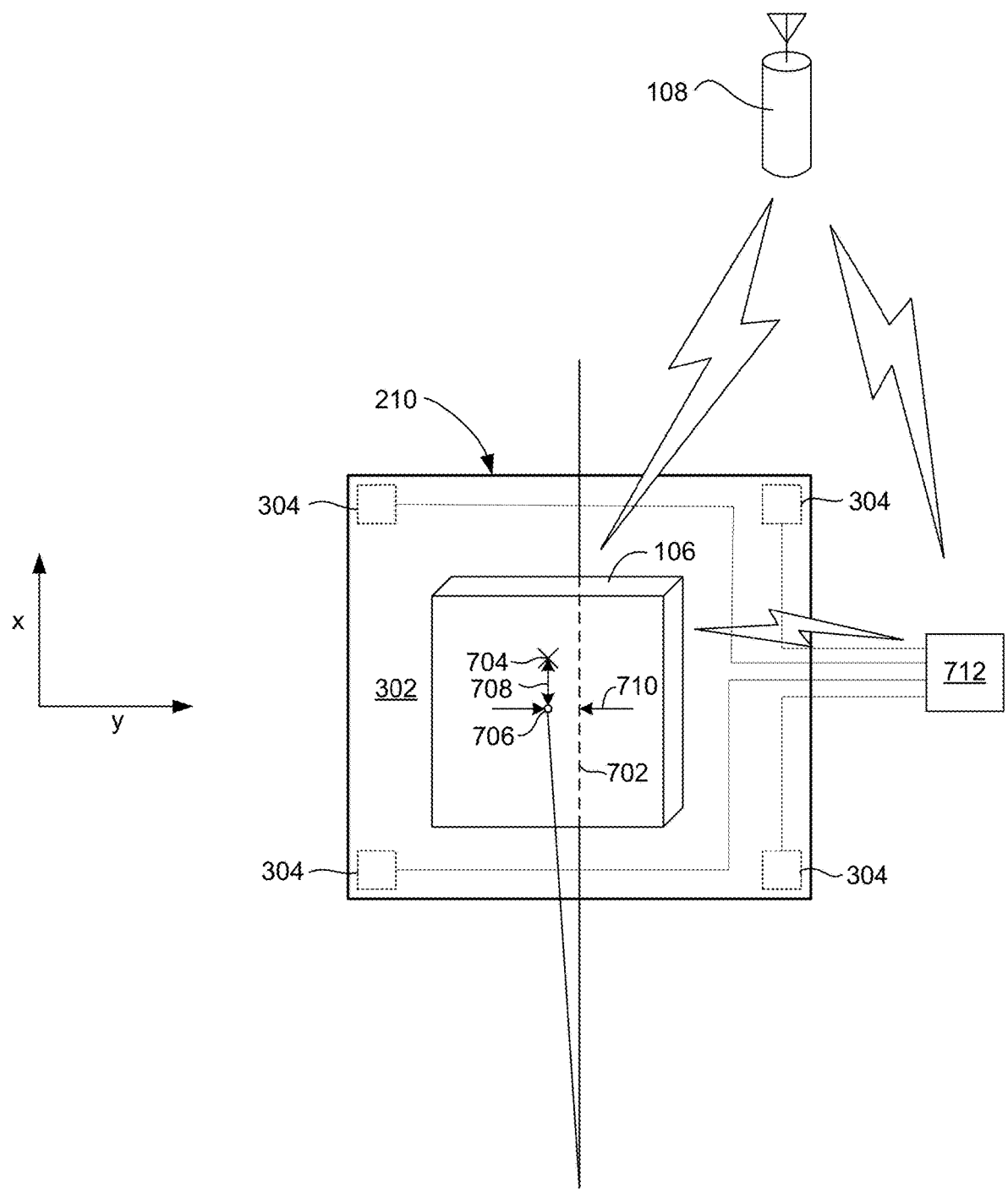
FIG. 7 is a schematic illustration illustrating the use of a weigh station for determining a center of gravity of a robotic carrier in order to determine a location of the robotic carrier on the weight station.

FIG. 7 shows a top-down view of a robotic carrier 106 as it moves in an X/Y plane across a workplace floor. The robotic rover is shown stationed on top of the weigh station 210. Ideally, the center of gravity of the robotic carrier 106 would travel along a desired path indicated by dashed line 702 and would stop at a desired location marked by X 704. Instead, certain deviation or variation from the intended stopping location may occur as a result of an incorrect speed of the robotic carrier 106 or inaccuracy in following the line 702 or other reasons as described above. While these variations may be small initially, they may cumulate as the robotic carrier moves through many stations leading to larger inaccuracy in the intended location of the robotic carrier 106 at each station 102 (FIG. 1). If the robotic carrier arrives at a station 102 at the wrong time, this can lead to significant problems with regard to overall process flow.

In FIG. 7, the circle 706 indicates the location of the center of gravity of the robotic carrier 106 when it has stopped on the weigh station 210. The distance between the center of gravity 706 of the robotic carrier 106 and the intended location 704 in the X direction is indicated by arrow 708. The distance between the center of gravity 706 of the robotic carrier 106 and the intended location 704 in the Y direction is indicated by line 710. However, because the weigh station has multiple weight sensors 304 (in this case 4) located at outer corners of the weigh station 210, the location of the center of gravity can be easily determined and corrected for.

As shown in FIG. 7, signals from each of the weight sensors 304 is sent to circuitry 712. Circuitry 712 is functional to determine the center of gravity of the robotic carrier 106 and compare this with a location of an intended or ideal center of gravity for the robotic carrier 106. The circuitry 712 can then determine a variation in the X direction 708 and a variation in the Y direction. This information can then be sent or transmitted to the central control unit 108 which can send or transmit commands to the robotic carrier correct or compensate the speed or direction of travel of the robotic carrier 106 to maintain correct location and travel of the robotic rover at subsequent stations 102 (FIG. 1), such as by adjusting the speed or direction of travel of the robotic carrier 106. The weigh station can be used as a robots' checkpoint by determining the speed and acceleration vectors of the robots. Those data e.g. velocity vector, acceleration vector can be used to calculate the motion status of robots such that the central unit is able to monitor the status of the production line and make necessary compensation. The data provided by the weigh station can also be used as the feedback of the robotics motion which can calibrate the robotics motion measurement collected by the robot itself, such that the robotics controller can provide more accurate control output. The possibility of a malfunctional robot in the production line will be reduced. This determination of the location of the robotic carrier 106 based on the location of its center of gravity as the robotic carrier 106 positions itself on the scale can be used to detect the operation of a malfunctioning robotic carrier 106, and to adjust process flow to compensate for malfunctioning, delayed or deviated robotic carriers 106.

While various embodiments have been described above, it should be understood that they have been presented by way of example only and not limitation. Other embodiments falling within the scope may also become apparent to those skilled in the art. Thus, the breadth and scope should not be limited by any of the above-described exemplary embodiments, but should be defined only in accordance with the following claims and their equivalents.

What is claimed is:

1. A system for fabricating non-rigid items, the system comprising:
   a robotic carrier configured to carry workpiece items between multiple workstations, at least one of the workstations comprising a weigh station; and
   a loading mechanism for loading one or more workpiece items onto the robotic carrier;
   wherein the weigh station further comprises:
   a scale configured to weigh the robotic carrier and one or more workpiece items loaded on the robotic carrier, the scale having a base and a plurality of weight sensors connected with the base;
   memory for storing an expected weight range of an individual workpiece;
   circuitry configured to receive a signal from the plurality of weight sensors and to determine a weight of the one or more workpieces loaded onto the robotic carrier and to determine a discrete number of workpieces loaded onto the robotic carrier based on the weight of the one or more workpieces and the expected weight range of the individual workpiece.

2. The system as in claim 1, wherein the circuitry is functional to transmit data regarding the discrete number of workpieces to a central control unit, the central control unit being functional to control movement of the robotic carrier and to control manufacturing operations at the multiple workstations.

3. The system as in claim 1, wherein the plurality of weight sensors comprises load cells.

4. The system as in claim 1, wherein the plurality of weight sensors comprises piezoelectric sensors.

5. The system as in claim 1, wherein the circuitry is functional to transmit the discrete number of workpieces to a user interface.

6. The system as in claim 1, wherein the expected weight range of an individual workpiece is based on a standard deviation of a sample set of similar workpieces.

7. The system as in claim 1, wherein the robotic carrier includes a camera and wherein the robotic carrier moves from one station to another by using the camera to follow a visible line and by detecting a series of visual checkpoints.

* * * * *